United States Patent [19]
Schlesinger et al.

[11] Patent Number: 5,248,394
[45] Date of Patent: Sep. 28, 1993

[54] LIQUID PURIFYING/DISTILLATION DEVICE

[75] Inventors: Barry Schlesinger; Harold Rapp, both of Marina Del Rey, Calif.

[73] Assignee: FSR Patented Technologies, Ltd., Las Vegas, Nev.

[21] Appl. No.: 855,979

[22] Filed: Mar. 23, 1992

[51] Int. Cl.$^5$ .................. B01D 3/10; B01D 3/42
[52] U.S. Cl. ..................... 202/205; 159/22; 159/44; 159/DIG. 16; 202/182; 202/185.1; 202/197; 202/202; 202/206; 203/2; 203/4; 203/91; 203/DIG. 14; 203/DIG. 18; 203/11
[58] Field of Search ........... 202/205, 160, 182, 185.1, 202/197, 202, 206, 269, 259; 203/1, 2, 4, 91, 40, 11, DIG. 18, DIG. 14; 159/22, 44, DIG. 16, DIG. 42, DIG. 40; 55/195, 189

[56] References Cited

U.S. PATENT DOCUMENTS

| | | | |
|---|---|---|---|
| 2,716,446 | 8/1955 | Ross | 202/205 |
| 3,324,009 | 6/1967 | Griffith et al. | 202/205 |
| 3,965,005 | 6/1976 | Boyd, Jr. et al. | 159/31 |
| 4,170,522 | 10/1979 | Buggele | 202/205 |
| 4,292,121 | 9/1981 | Caffes | 203/24 |
| 4,366,030 | 12/1982 | Anderson | 202/205 |
| 4,561,940 | 12/1985 | Meier | 202/205 |
| 4,613,412 | 9/1986 | MacDermid | 202/205 |
| 4,686,009 | 8/1987 | McCabe | 203/91 |
| 4,696,718 | 9/1987 | Lasater | 202/176 |
| 4,749,447 | 6/1988 | Lew | 202/205 |
| 4,759,825 | 7/1988 | Medvey et al. | 202/205 |
| 4,985,122 | 1/1991 | Spencer | 202/205 |
| 5,064,505 | 11/1991 | Borgren | 202/205 |

FOREIGN PATENT DOCUMENTS

| | | | |
|---|---|---|---|
| 664466 | 6/1963 | Canada | 202/205 |
| 3345937 | 7/1985 | Fed. Rep. of Germany | 202/205 |
| 549820 | 12/1942 | United Kingdom | 202/205 |
| 8102154 | 8/1981 | World Int. Prop. O. | 202/205 |

Primary Examiner—Virginia Manoharan
Attorney, Agent, or Firm—Ladas & Parry

[57] ABSTRACT

A distillation purifying system including a section which creates a vacuum pressure that is transmitted throughout the system, a distillation/purification zone in which fluids to be distilled/purified are treated, and a collection zone in which the distilled/purified liquids are transferred. The system is effective for use with liquids, solutions, fluids and the like and can be used for water treatment as well as bodily fluid treatment.

17 Claims, 2 Drawing Sheets

LIQUID PURIFYING/DISTILLATION DEVICE

CROSS REFERENCE TO RELATED APPLICATION

This invention is reflected at least in part in U.S. Disclosure Document Ser. No. 301,003 received by the U.S. Patent Office on Feb. 10, 1992 and incorporated herein by reference.

BACKGROUND OF THE PRIOR ART

There is a recognized need to convert undrinkable water to potable water and to have the ability to cleanse liquids in general. Many inventions have been created to attend to this need. A list of such inventions includes the following.

U.S. Pat. No. 5,064,505 (Borgren)
U.S. Pat. No. 4,770,748 (Cellini)
U.S. Pat. No. 4,954,223 (Leary)
U.S. Pat. No. 4,696,718 (Lasater)
U.S. Pat. No. 4,525,243 (Miller)
U.S. Pat. No. 4,585,524 (Hoiss)
U.S. Pat. No. 4,595,460 (Hurt)
U.S. Pat. No. 4,248,672 (Smith)
U.S. Pat. No. 4,267,022 (Pitcher)
U.S. Pat. No. 4,269,664 (Younger)
U.S. Pat. No. 4,282,070 (Egosi)
U.S. Pat. No. 3,597,328 (Michels)
U.S. Pat. No. 3,489,652 (Williamson)
U.S. Pat. No. 3,425,235 (Cox)
U.S. Pat. No. 3,440,147 (Rannenberg)
U.S. Pat. No. 3,236,748 (Pottharst, Jr.)
U.S. Pat. No. 3,203,875 (Sturtevant)
U.S. Pat. No. 4,555,307 (Hagen)
U.S. Pat. No. 4,686,009 (McCabe)
U.S. Pat. No. 4,285,776 (Atwell)
U.S. Pat. No. 4,366,030 (Anderson)
U.S. Pat. No. 3,248,305 (Williamson)
U.S. Pat. No. 3,390,057 (Day)
U.S. Pat. No. 3,140,986 (Hubbard)

The S-200 Vapor Compression Water Processor TM produced by Superstill Technology Inc.

Unfortunately, many of these inventions are unduly complex, ungainly, uneconomical, unworkable, and/or not as efficient or as effective as they might be. The present invention attempts to overcome these drawbacks and to disclose an advance to the art. The present invention is essentially a closed loop system recycling heat, energy, and fluid to a maximum extent.

BACKGROUND OF THE INVENTION

The purpose of the first embodiment of this invention is to convert salt water, brackish water, contaminated ground water, or contaminated water from large bodies of water to potable quality water which can be used for irrigation, human and animal consumption, or industrial or manufacturing needs. The device employs a vacuum distillation process which is believed to remove virtually all dissolved solids, particulates, bacteria, and organic matter from contaminated water. The device is environmentally desirable in that it does not concentrate brine residues or discharge high temperature water. While the following description directs itself to the cleansing of water, the cleansing of other liquids is also contemplated.

The purpose of the second embodiment of this invention is to separate certain specific fluids in solution and to separate certain fluids from contaminants and solids, such as salts and bacteria. The second embodiment is directly applicable to the separation of water from ethylene glycol solutions (aircraft de-icing solutions), and to the separation and vapor distillation of certain fluids, including but not limited to the separation of fluids for medical purposes such as blood processing and dialysis. The second embodiment of this invention offers great versatility through the use of a computer controlled system which allows the selection of various fluids or liquids based upon their vaporization points under vacuum conditions. The device removes unwanted liquids such as water, from solutions which enables the economical transport of the remainder of the solution. It also enables one to separate a specific fluid from a solution, such as glycol. For purposes of explanation only, the removal of water from a solution of ethylene glycol and water is primarily discussed herein.

Both embodiments make use of unshown sensor means and computers which sense and activate portions of the invention. These are well known to those skilled in the art.

SUMMARY OF THE INVENTION

Disclosed herein in a distillation/purifying system comprised of:
a vacuum means;
a distillation/purifying means in fluid communication with said vacuum means; and
a collection area in fluid communication with said vacuum means and said distillation/purifying means, said distillation purifying means communicating distilled/purified fluid to said collection area and comprising a trap through which said distilled/purified fluid flows to said collection area.

Also disclosed herein is a distillation/purifying system comprised of:
a vacuum means;
a distillation/purifying means having heating means therein, said distillation/purifying means being in fluid communication with said vacuum means; and
a collection area in fluid communication with said vacuum means and said distillation/purifying means, said distillation purifying means communicating distilled/purified fluid to said collection area and while separating and disposing of the fluids in which said distilled/purified fluid was mixed, said heating means being activated for use in said distillation/purifying means only after said computer control system ensures that the vacuum level in said system is at a latent heat of vaporization point which corresponds to a set relationship with respect to the temperature of the fluid to be distilled/purified.

DETAILED DESCRIPTION OF THE INVENTION

Figure 1:
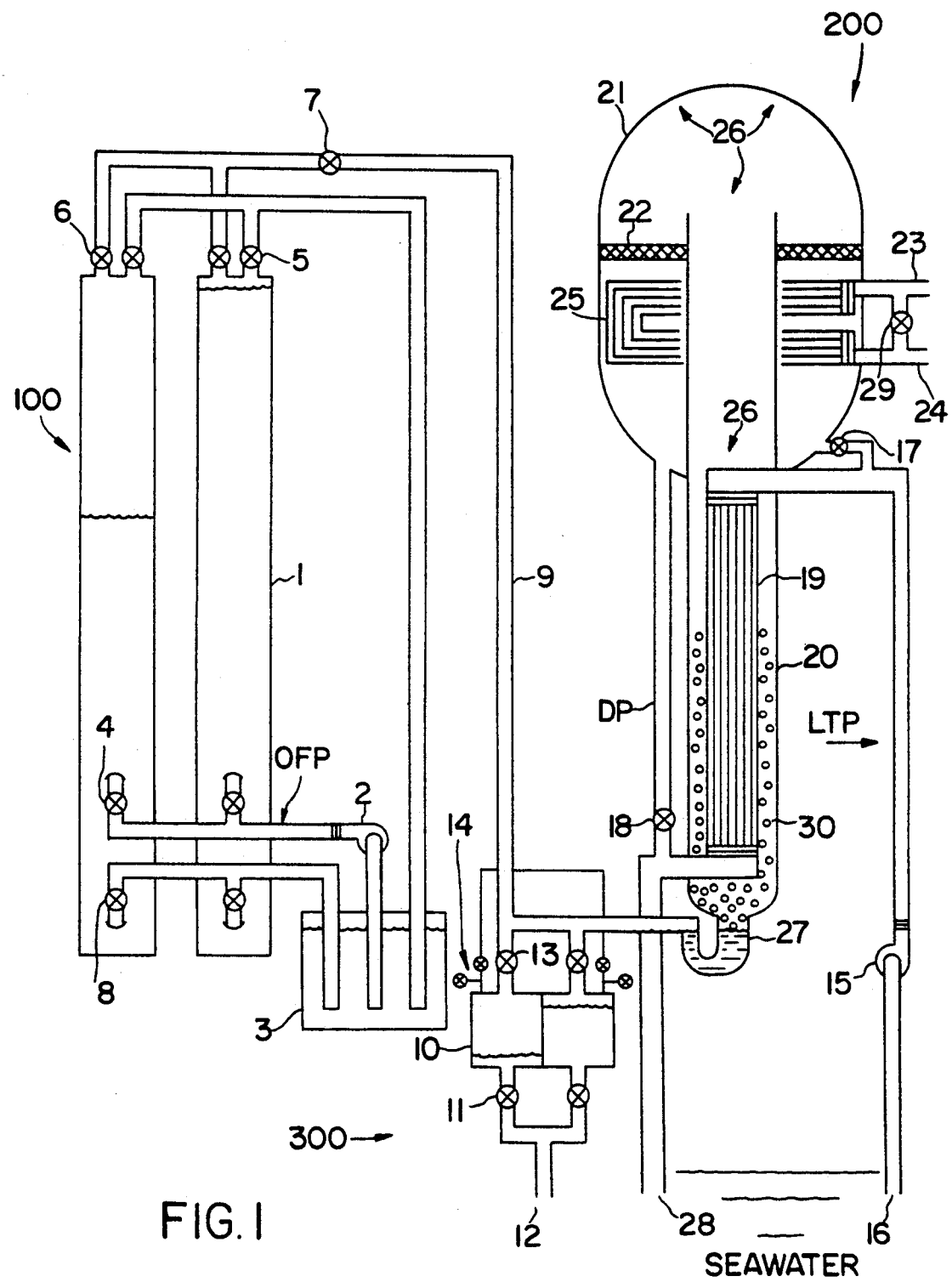
FIG. 1 is a diagrammatic view of a first embodiment of the invention.

The present invention as first disclosed in FIG. 1, may be broadly broken into three areas of study. These are the Vacuum Generating Section (100), the Liquid Cleansing Area (200), and the End Collection Zone (300).

Vacuum Generating Section (100)

In FIG. 1, the Vacuum Generating Section (100) is defined by reference numerals (1) through (9). Two oil-filled towers (1) used to create a vacuum, are seen standing generally side by side and connected in parallel as further described herein. More than two oil-filled towers (1) can be included. The oil-filled towers (1) are preferably 35 to 50 feet in height and preferably 6 to 14 inches in diameter. Greater diameters are, however, within the contemplation of this invention. The oil-filled towers (1) are filled with a synthetic oil (polyalphaolefin) or other similar liquid exhibiting similar physical characteristics. The oil-filled towers (1) chosen for use are preferably made of steel pipe or similar material that is: a) capable of sustaining the vacuum levels that are generated within each tower, and b) able to function as structural support members for the insulated evaporator chamber (21) and insulated vapor condensing tower (20) discussed with respect to the Liquid Cleansing Area (200).

A vented oil tank (3) is provided at the base of the oil-filled towers (1) for oil to be drained therein and pumped therefrom. Between the lower portion of oil-filled towers (1) and vented oil tank (3), is oil pump (2) connected in fluid communication with each of oil-filled towers (1) and vented oil tank (3) through oil feeder pipe (OFP). Oil pump (2) instead could be a submersible pump and be situated within vented oil tank (3). Oil feeder pipe (OFP) is connected at first ends by means of tower oil fill valves (4) to the lower portion of each of oil-filled towers (1) and at a second end extends within vented oil tank (3). Between the first ends and the second end is oil pump (2), it being located above and outside of vented oil tank (3). Oil pump (2) is used to transfer the oil from the vented oil tank (3) to the oil-filled towers (1) until a level sensor within each oil tank (not shown) indicates that an oil-filled tower (1) is filled completely with oil. When one of the tower sensors indicates that its respective oil-filled tower (1) is filled, an automated tower vent valve (5) seen located at the top of each oil-filled tower (1), allows excess oil to flow through return piping back to vented oil tank (3).

Below each tower oil fill valve (4) on each oil-filled tower (1) is a tower oil drain valve (8) connected to a lower portion of oil-filled tower (1). Tower oil drain valve (8) is also connected to yet another pipe which extends into vented oil tank (3). Tower oil drain valve (8) enables oil to drain by means of gravity from oil-filled tower (1) back into vented oil tank (3).

Finally, at the top of oil-filled each tower (1) and near tower vent valve (5) is tower vacuum valve (6) connecting oil-filled tower (1) to vacuum piping (9). The tower vent valve (5), the tower vacuum valve (6), the tower oil fill valve (4), and tower oil drain valve (8) are automated control valves. They and the level sensor in each tower (1), regulate the activity of the oil-filled towers (1) such that tower oil valve (8) at the bottom of the oil-filled tower (1) opens to allow oil to drain to the vented oil tank (3) while the other valves (4) (5) (6) are closed. This draining of oil creates a substantial vacuum within the oil-filled tower (1), which is transmitted to the rest of the system when tower vacuum valve (6) opens and allows the vacuum to be transmitted through vacuum regulating valve (7) and vacuum piping (9). The oil inside the oil-filled towers (1) does not vaporize under the extreme vacuum conditions because the oil is at ambient temperature. The vacuum regulating valve (7) has a capillary bleed-off (not shown) to control the vacuum level transmitted through vacuum piping (9) to the rest of the system at the level specified by a computer control system associated with the system of FIG. 1. Such computer control systems are well known to those skilled in the art.

In use, the oil-filled towers (1) alternately fill with oil and drain to approximately the 35 foot level in towers 42 to 50 feet in height, the level corresponding to the effect of one atmosphere. This alternating action results in a continuous vacuum being supplied to the system through vacuum regulating valve (7) and vacuum piping (9). Oil pump (2) is cycled on and off by the computer as required to fill the oil-filled towers (1).

The interrelationship of the oil-filled towers (1) in their draining and filling of oil can be likened to the actions of pistons in an engine, and it is of note that this section could be replaced by another known vacuum device, preferably a water seal vacuum pump with air ejectors.

Liquid Cleansing Area (200)

The Liquid Cleansing Area (200) (which may be referred to as the distillation area), is seen in FIG. 1 as composed of reference numerals (15) through (29). At the heart of this area is insulated evaporator chamber (21) which is somewhat rounded in shape although its height is greater than its width. Insulated evaporator chamber (21) is integrally connected to insulated vapor condensing tower (20) which is tubular in shape and has a diameter that is less than that of the insulated evaporator chamber (21). Insulated evaporator chamber (21) and insulated vapor condensing tower (20) as combined are preferably 42 to 50 feet in overall height. Insulated vapor condensing tower (20) itself can vary in height, and the insulated evaporator chamber (21) is preferably 8 to 15 feet in height. However, depending upon end goals these heights may differ significantly as would be appreciated by those skilled in the art. It is to be clearly understood that insulated vapor condensing tower (20) extends upward and into insulated evaporator chamber (21) and has an open end that is spaced from the top inside portion of insulated evaporator chamber (21). This is shown in FIG. 1.

The base of insulated vapor condensing tower (20) opens into insulated distillate water trap (27) such that it is in fluid communication therewith. Insulated distillate water trap (27) is a U in shape with the leg of the U which connects to the base of insulated vapor condensing tower (20) being wider than the opposing leg and the base. This is a typical trap that is readily available in the market. The opposing leg connects to and is integral with vacuum piping (9) so that the vacuum pressure created in Vacuum Generating Section (100) is communicated to Liquid Cleansing Area (200) through vacuum piping (9). This vacuum is then transmitted through insulated distillate water trap (27) to insulated vapor condensing tower (20) in the vapor expansion area (26) seen to extend longitudinally in insulated evaporator chamber (21) and within insulated vapor condensing tower (20) and then to include the upper half of insulated evaporator chamber (21).

Extending within insulated vapor condensing tower (20) is open tube bundle heat exchanger (19) comprised of heat exchanger tubes. The top end of open tube bundle heat exchanger (19) is connected to a liquid transfer pipe (LTP) which initially extends transversely from and into insulated vapor condensing tower (20) and the base of insulated evaporator chamber (21) and then angles downwardly generally parallel to insulated vapor condensing tower (20) to interconnect with seawater supply pump and filter strainer (15) and descend into the liquid (16) that is to be purified. This liquid may be seawater or other contaminated water source from a large body of water (16), and is usually at 50 to 70 degrees fahrenheit, although hotter or colder temperatures are within the operating ranges of the device. Seawater supply pump and filter strainer (15) pumps this liquid through the piping (LTP) to open tube bundle heat exchanger (19). The liquid enters open tube bundle heat exchanger (19) and flows through the heat exchanger tubes, absorbing heat from the water vapors which surround the outside of the tubes as discussed below. The water vapor is thereby caused to condense on the outside of the tubes and become droplets of liquid (30) due to this absorption of heat by the water inside the open tube bundle heat exchanger (19). The liquid which has passed through the open tube bundle heat exchanger (19), is then discharged through seawater and brine discharge piping (28) back to its area of origin, only slightly warmer than the temperature at which it was originally supplied by seawater supply pump and filter strainer (15). By this it is meant that the water that is returned is usually not more than 5 degrees warmer than when it was originally supplied.

Seawater and brine discharge piping (28) is connected at the bottom end of the open tube bundle heat exchanger (19). Seawater and brine discharge piping (28) extends transversely from within insulated vapor condensing tower (20) to the outside of condenser tower (20) and then angles downwardly to empty into the body of liquid, such as seawater (16), into which liquid transfer pipe (LTP) extends at its end furthest from open tube bundle heat exchanger (19). Thus just as the oil vented oil tank (3) is carried in a circle from vented oil tank (3) back to vented oil tank (3), so is the liquid from point (16) carried in a circle. That is it is carried from a first area into liquid transfer piping (LTP) and returned by seawater and brine discharge piping (28) to the same area.

Extending from the portion of liquid transfer pipe (LTP) which is situated transverse to the longitudinal axis of insulated vapor condensing tower (20) and lies outside thereof, is a branch pipe of smaller diameter than that of the liquid transfer pipe (LTP). This smaller branch pipe extends generally parallel to the upper portion of the liquid transfer pipe (LTP) and into the base of insulated evaporator chamber (21). A make-up water regulating valve (17) affects the communication between the branch pipe and the liquid transfer pipe (LTP). However, when the make-up water regulating valve (17) is open, the liquid passing through liquid transfer pipe (LTP) enters the insulated evaporator chamber (21) through make-up water regulating valve (17). This design and the opening and closing of make-up water regulating valve (17) enable the system to maintain the proper water level inside insulated evaporator chamber (21). That is a level just below the demister pad(s) (22) and yet covering the open tube bundle heat exchanger (25) which is discussed below. In certain installations in which the entering liquid such as seawater (16) has a high concentration of oxygen and gasses, a degassification chamber, such as described in the second embodiment herein, would be added between make-up water regulating valve (17) and insulated evaporator chamber (21). This degassification chamber enables the removal of a majority of these gasses from the liquid.

Extending within insulated evaporator chamber (21) and around the inside sides of that insulated evaporator chamber (21) and in its lower half, is an open tube bundle heat exchanger (25) which heats the seawater contained in the lower half of the insulated evaporator chamber (21). As seen in FIG. 1, open tube bundle heat exchanger (25) is fed by heating source supply piping (23) through which a heated medium is passed into the open bundle heat exchanger (25), the medium then exiting through heating source return piping (24). Situated between and communicating with both heating source supply piping (23) and heating source return piping (24) is flow regulating/bypass valve (29) which enables communication between both sections if desired. Operation of a heat exchanger such as shown at (23), (24), (25), and (29) is well known in the art.

It should be understood that there are different configurations of heat exchangers that can perform the same function as that just described with respect to open tube bundle heat exchanger (25). Further, the location of the heat exchanger inside insulated evaporator chamber (21) can be varied from U-shaped to circular although in all instances the heat exchanger must heat the liquid in the lower half of the insulated evaporator chamber (21). It must not however, be inside the chamber nor must it follow the inside configuration of the insulated evaporator chamber (21), and in some instances, it may be wrapped around the lower half of the evaporator chamber (21).

Again, it must only heat the water below the demister that is in the base area of insulated evaporator chamber (21). Sources of heat for this open tube bundle heat exchanger (25) are well known in the art. However, some examples are:

a. 80 to 100 degree fahrenheit cooling tower water from industrial-process or a commercial HVAC system.

b. Heat reclaimed from an internal combustion engine coolant and exhaust manifold.

c. Low pressure steam.

d. Solar, geothermal, or other free heat.

It should be understood that this device recovers low levels of processed heat normally discarded in other systems and reuses this heat for the process of creating fresh water from contaminated water. In other words, this device may be viewed as offering at least two solutions to two problems. These two problems and solutions are that, the device purifies and distills a contaminated liquid (such as seawater to potable water) and in doing so removes heat from an outside source processed liquid and feeds it into the system here through open tube bundle heat exchanger (25) which then returns the outside source processed liquid at a lower temperature for reuse in the external system. Prior art inventions do not make use of low level processed heat from outside sources. Thus the present invention replaces or supplements the function of the cooling tower or its equivalent since it recovers at least a preponderance of the heat of rejection. This latter aspect is not captured by the inventions known to the inventor.

Extending parallel to and above open tube bundle heat exchanger (25) and generally centrally of insulated evaporator chamber (21), is a demister or demister pads (22). The liquid such as seawater which enters insulated evaporator chamber (21) by means of the branch pipe and make-up water regulating valve (17), is heated to approximately 10 degrees fahrenheit above its original temperature by the heat source flowing through open tube bundle heat exchanger (25). (Prior to introducing a heat source into open tube bundle heat exchanger (25) within insulated evaporator chamber (21), the computer control system ensures that insulated evaporator chamber (21) is filled with seawater to a correct water level, and that the system vacuum level is established through vacuum piping (9) to insulated evaporator chamber (21) at latent heat of vaporization point under vacuum conditions which corresponds to a set relationship with respect to the temperature of the seawater within insulated evaporator chamber (21). Introduction of heat to the open tube bundle heat exchanger (25) may then begin.)

Since insulated evaporator chamber (21) is under vacuum pressure due to its ultimate connection to vacuum piping (9) by way of insulated vapor condensing tower (20) and insulated distillate water trap (27), vigorous vaporization of the liquid, likely seawater, contained in insulated evaporator chamber (21) occurs as the seawater warms. As this vaporization occurs, demister or demister pads (22) serves to limit any carryover of salt particles into the resulting vapor stream. As the liquid, here presumably seawater, vaporizes, salts and other contaminants are separated and settle toward the bottom of insulated evaporator chamber (21). The vapor meanwhile passes through the demister or demister pads (22) and ultimately into vapor expansion area (26) which extends above demister or demister pads (22) in FIG. 1 and as further discussed below. Extending outside of, from the base of insulated evaporator chamber (21), and generally parallel with and alongside of insulated vapor condensing tower (20) is a discharge pipe (DP). Discharge pipe (DP) connects by means of a brine discharge regulating valve (18) to seawater and brine discharge piping (28). This connection allows the concentrated salts resulting from the vaporization in the insulated evaporator chamber (21) to be discharged from insulated evaporator chamber (21) and returned to the main source of liquid such as seawater (16). Instead this discharge may be used with known turbine technology which can recover the power from this discharge and convert it into electric power which can be used to power heating electrodes (not shown) to supply supplemental heat to insulated evaporator chamber (21).

Returning to the vaporization in the insulated evaporator chamber (21), as the seawater or other liquid vaporizes and passes through the demister or demister pads (22), the vapors expand in the insulated evaporator chamber (21) and are pulled into the insulated vapor condensing tower (20) through vapor expansion area (26) due to the vacuum which is transmitted from vacuum piping (9) through insulated distillate water trap (27). The vapors condense on the cooler open tube bundle heat exchanger tubes (19) and then fall as water (30) and collect in the insulated distillate water trap (27) at the base of the insulated vapor condensing tower (20). As soon as the insulated distillate water trap (27) fills completely with water, a pressure differential develops between the vapor in insulated evaporator chamber (21) and the vacuum in vacuum piping (9). This pressure differential causes the water in the trap to flow in the piping to the insulated distillate water collection tanks (10) which are discussed in greater detail with respect to End Collection Zone (300). The trap feature is unique in that once the insulated distillate water trap (27) is filled with water the vacuum requirement in the system diminishes because the vacuum is applied only to the water in the insulated distillate water trap (27). As the water exits the trap (27), it does not simply revaporize because the vacuum level from vacuum piping (9) is computer controlled to a latent heat of vaporization point under vacuum pressure which corresponds to a temperature greater that a temperature of the water condensing in the insulated distillate water trap (27).

It is to be understood that the present invention can be configured differently. As an example, the open tube bundle heat exchanger (19) could be horizontally located within insulated vapor condensing tower (20). This would reduce the overall height of insulated vapor condensing tower (20) and increase its diameter. Insulated vapor condensing tower (20) would then be a short horizontal unit.

End Collection Zone (300)

End Collection Zone (300) is composed of reference numerals (10) through (14) in FIG. 1.

Located below the joinder of vacuum piping (9) and insulated distillate water trap (27) are insulated distillate water collection tanks (10). Each insulated distillate water collection tank (10) has on its topmost portion a water inlet control valve (13) which connects it via a pipe to vacuum piping (9). At the opposite, bottom end of each insulated distillate water collection tank (10) is a collection tank drain valve (11) which connects each insulated water collection tank (10) to a pipe which empties the distilled liquid from insulated water collection tanks (10) into a desired location for potable water. Vent and vacuum control valves (14) are connected to the tops of insulated distillate water tanks (10) and in part to each other to vent each insulated distillate water collection tank (10) to atmosphere or seal the insulated distillate water collection tanks (10) within the vacuum system.

In use, the water from insulated distillate water trap (27) flows toward the two or more insulated distillate water collection tanks (10) due to the vacuum pressure transmitted through vacuum piping (9). The insulated distillate water collection tanks (10) are exposed to the vacuum pressure in vacuum piping (9) when water inlet valve (13) is open and collection tank drain valve (11) and vacuum and vent control valves (14) are closed. The water collection tanks are at the same vacuum level as the vacuum transmitted through vacuum piping (9). Thus with water inlet control valve (13) open, the distilled water flowing from the insulated distillate water trap (27) flows into the first insulated distillate water collection tank (10), filling it with water. When the first insulated distillate water collection tank (10) is filled, water inlet control valve (13) for that insulated distillate water collection tank (10) closes and collection tank drain valve (11) for that insulated distillate water collection tank (10) opens. The vent control valve at (14) for that insulated distillate water collection tank (10) also opens at that time so that the water inside the insulated distillate water collection tank (10) will drain into the potable water discharge piping (12). As soon as the insulated distillate water collection tank (10) just drained is empty of water, vented control valve at (14) closes, water inlet control valve (13) remains closed, collection tank drain valve (11) closes, and vacuum control valve at (14) opens to evacuate all air from the insulated distillate water collection tank (10). Vacuum valve at (14) closes as soon as the tank is evacuated of such air, and water inlet control valve (13) is reopened to receive once again the distilled water from insulated distillate water trap (27). Known sensors controlled by the computer system are used in End Collection Zone (300) to facilitate the appropriate opening and closing of the valves.

The insulated distillate water collection tanks (10) alternately drain and fill with water so that a continuous flow of water from water trap (27) to one of tanks (10) occurs. The insulated distillate water collection tanks (10) are insulated to isolate them from ambient temperatures, and the piping from the insulated distillate water trap (27) to the insulated distillate water collection tanks (10) is also insulated.

The elements described in End Collection Zone (300) could be replaced by a known rotating vane device.

Figure 2:
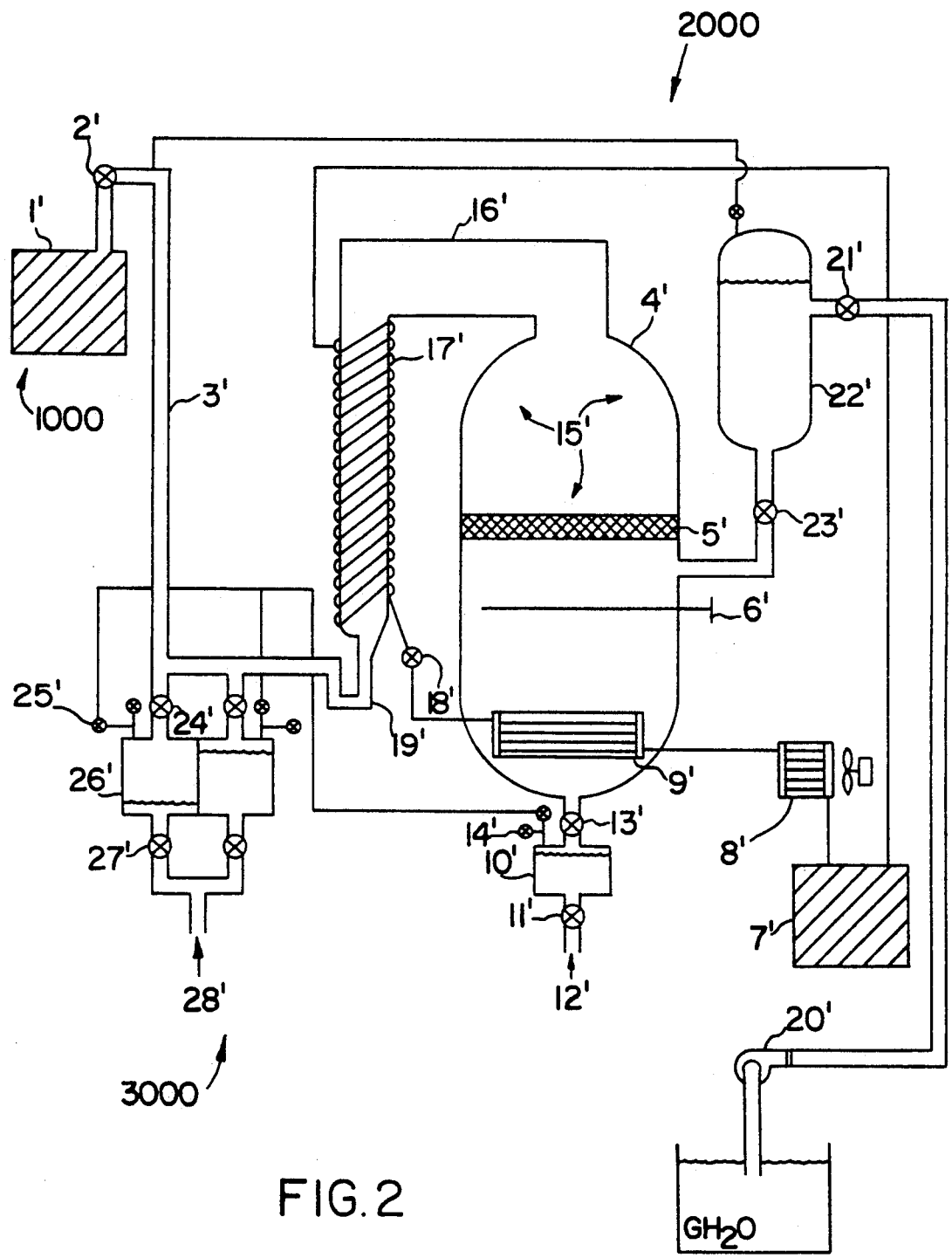
FIG. 2 is a diagrammatic view of a second embodiment of the invention.

Turning now to FIG. 2 and the second embodiment of this invention a liquid purifying/distilling invention is disclosed.

FIG. 2, may be divided again into three major areas: a Vacuum Generating Section (1000); a Liquid Cleansing Area (2000); and an End Collection Zone (3000).

Vacuum Generating Section (1000)

This first area is composed of reference numerals (1') through (3') of FIG. 2. As in FIG. 1, vacuum pressure is used throughout the system. In this embodiment, the vacuum pressure is created by the use of a water seal vacuum pump equipped with air ejectors (1') and self contained cooling feature. This water seal vacuum pump with air ejectors (1') transmits vacuum through vacuum regulating valve (2') seen in FIG. 2 as located above water seal vacuum pump with air ejector (1') and connected thereto by vacuum piping (3'). When vacuum regulating valve (2') is open, the vacuum pressure created by water seal vacuum pump with air ejectors (1') is transmitted throughout vacuum piping (3') and the entire system of the second embodiment of this invention as seen in FIG. 2.

The vacuum regulating valve (2') has a capillary bleed-off to control the vacuum level transmitted through vacuum piping (3') to the rest of the system at the level specified by a computer control system known to those skilled in the art. It is of note that on larger applications of this invention, this section can be substituted in its entirety by the Vacuum Generating Section (100) described in FIG. 1 which utilizes oil-filled towers to produce the same vacuum effect. In certain smaller applications, a standard vacuum pump, usually two stage with an inline desiccant or moisture vapor trap of some type, may be substituted for the water seal vacuum pump.

Liquid Cleansing Area

This second area, (which may also be referred to as the distillation area), is composed of reference numerals (4') through (23') in FIG. 2. An insulated evaporator chamber (4') is flanked on either side by an insulated and refrigerated heat exchanger (cold) (17') and an insulated degassification chamber (22'). Insulated evaporator chamber (4'), shown as capsular in shape, is in fluid communication with both. Insulated vapor collection piping (16') extends between the tops of insulated evaporator chamber (4') and insulated and refrigerated heat exchanger (cold) (17'), and piping extends between the base of the insulated degassification chamber (22') and the lower portion of the insulated evaporator chamber (4'). Refrigerant condenser coils (hot) (9') are located in the base of insulated evaporator chamber (4') in FIG. 2, but could as well be wrapped around the outside of the lower portion of insulated evaporator chamber (4') to transfer the same heat effect to the liquid under demister (5') and in the lower portion of insulated evaporator chamber (4'). Refrigerant condenser coils (hot) (9') are connected at one end to a supplemental refrigerant heat exchanger (8') with fan or other cooling means and a refrigeration heat pump (7') all of which are located outside of insulated evaporator chamber (4'). In FIG. 2 supplemental refrigerant heat exchanger (8') is shown generally below insulated and refrigerated heat exchanger (cold) (17') but does not need to be in that location. At their other end, refrigerant condenser coils (hot) (9') are connected through refrigeration expansion valve (18') to the base of the refrigeration coils that makeup insulated and refrigerated heat exchanger (cold) (17'). In this way, the typical closed cycle of a heat/coolant system is used to advantage herein to produce heat in insulated evaporator chamber (4') and to remove heat in insulated and refrigerated heat exchanger (cold) (17').

Glycol and water solution from a glycol and water solution tank ($GH_2O$) is transmitted to the upper portion of insulated degassification chamber (22') by solution feed pump with inlet filter/strainer (20'). Solution feed pump with inlet filter/strainer (20') transfers the glycol and water solution through piping extending from the glycol and water solution tank ($GH_2O$) to insulated degassification chamber (22') by means of solution regulating valve (21'). Solution regulating valve (21') opens to allow a proper solution level to be maintained in insulated degassification chamber (22'). The proper solution level is approximately 75 percent full so that there is only a small area at the top for degassification.

The base of insulated and refrigerated heat exchanger (cold) (17') is connected through a U shaped trap known in the art and more accurately described herein as an insulated distillate liquid trap (19'), to vacuum piping (3'). This connection causes insulated degassification chamber (22') to be in direct communication with vacuum piping (3') emanating from the Vacuum Generating Section (1000). This vacuum provides the initial degassification of dissolved gases from the glycol solution contained within insulated degassification chamber (22'). A solution make-up regulating valve (23') placed between the connection of degassification chamber (22') and insulated evaporator chamber (4') regulates the flow of solution from degassification chamber (22') to insulated evaporator chamber (4') to maintain a proper solution level in insulated evaporator chamber (4'). That level is just below the demister or demister pads (5') and covering refrigerant condenser coils (hot) (9') and supplemental heating electrode (6') if used.

Above the connection between insulated degassification chamber (22') and insulated evaporator chamber (4') and extending transversely across the inside of insulated evaporator chamber (4') generally at its mid point, is demister or demister pads (5'). Below demister (5') but above refrigerant condenser coils (hot) (9') is a supplemental heating electrode (6') which is optionally included and is isolated from the fluid that is held in insulated evaporator chamber (4'). Isolated and supplemental heating electrode (6') facilitates the more exact control of the fluid temperature in the lower portion of insulated evaporator chamber (4'). Supplemental heating electrode (6') extends from the inside of insulated evaporator chamber (4') to its outside and rests within a well in the insulated evaporator chamber (4') that is not shown.

Below insulated evaporator chamber (4') is an insulated fluid collection tank (10'). The top of this insulated fluid collection tank (10') is fluidly connected through collection tank inlet valve (13') to the base of insulated evaporator chamber (4'). Through another connection at its top, insulated fluid collection tank (10') is connected by a vent valve at (14') to the atmosphere and by a vacuum valve at (14') to vacuum piping (3'). At the base of insulated fluid collection tank (10') is collection tank drain valve (11'). The base of insulated fluid collection tank (10') may be opened by collection tank drain valve (11') to drain out the contents in the insulated fluid collection tank (10') through discharge piping (12') when the vent valve at (14') opens as described in greater detail below.

The solution passing through insulated degassification chamber (22') enters insulated evaporator chamber (4') where it is heated by means of refrigerant condenser coils (hot) (9') and supplemental heating electrode (6'), if used. Through this heating, the water in the solution vaporizes and separates from the glycol, the glycol being left in liquid form. This water vapor passes through demister (5') while the glycol concentrates and drops into insulated fluid collection tank (10') by means of collection tank inlet valve (13'). When a specific gravity sensor (not shown) associated with insulated fluid collection tank (10') indicates to a computer hooked to the system of FIG. 2 but not shown, that the concentration in insulated fluid collection tank (10') is proper, collection tank inlet valve (13') closes, the vacuum valve at (14') remains closed, collection tank drain valve (11') opens and the vent valve at (14') opens to the atmosphere to allow the glycol to drain into potable water discharge piping (12). When all of the glycol has drained from tank (10'), collection tank drain valve (11') closes, collection tank inlet valve (13') remains closed, the vent valve at (14') closes, and the vacuum valve at (14') opens to evacuate insulated fluid collection tank (10') of air. When insulated fluid collection tank (10') has returned to a vacuum pressure, the vacuum valve at (14') closes, and collection tank inlet valve (13') slowly opens and allows the liquid at the lower portion of insulated evaporator chamber (4') to enter insulated fluid collection tank (10'). This liquid will again be displaced by concentrated glycol and the process repeats itself.

The vaporized water in insulated evaporator chamber (4') passes through the demister (5') and fills vapor expansion area (15') in the top half of insulated evaporator chamber (4'). From here it is pulled toward the insulated and refrigerated heat exchanger (cold) (17'). In the insulated and refrigerated heat exchanger (cold) (17') the vapor gives up its heat and condenses into a liquid and collects in the insulated distillate liquid trap (19') below the insulated and refrigerated heat exchanger (cold) (17').

It is to be understood that different configurations of this embodiment are possible and particularly in large applications the following possibility amongst many might be considered. Insulated and refrigerated heat exchanger (cold) (17') could be situated below insulated evaporator chamber (4') similar to that shown in FIG. 1 with connections to the upper and lower portion of evaporator chamber (4') being modified to match that shown in FIG. 1 with respect to insulated evaporator chamber (21). It is also to be understood that other heating and cooling sources and means can be used in lieu of the heat pump to accomplish the same purposes.

End Collection Zone (3000)

This area of FIG. 2 is composed of reference numerals (24') through (28') and is located between the Vacuum Generation Zone (1000) and the Liquid Cleansing Zone (2000). Broadly, it is comprised of at least two insulated distillate collection tanks (26') which are in fluid communication through a water inlet control valve (24') in each instance, at their top ends with vacuum piping (3') and insulated distillate liquid trap (19'). Also at their top ends they are connected by vacuum and vent control valves at (25') either to the atmosphere or to vacuum piping (3'). The base of each insulated distillate collection tank (26') is connected by means of one collection tank drain valve (27') each to discharge piping (28').

The water from insulated distillate liquid trap (19') flows through the piping connecting it to vacuum piping (3') and insulated distillate collection tanks (26'). It flows toward the two or more insulated distillate collection tanks (26') due to the effects of the vacuum transmitted through vacuum piping (3'). The water exiting insulated distillate liquid trap (19') does not revaporize because the computer control system selects the vacuum level at vacuum piping (3') which corresponds to the latent heat of vaporization point for water which corresponds to a higher temperature than the temperature of water exiting insulated distillate liquid trap (19'). The insulated distillate collection tanks (26') are subjected to vacuum from vacuum piping (3') when water inlet valve (24') is open, collection tank drain valve (27') is closed, and vacuum and vent valves at (25') are closed. The insulated distillate collection tanks (26') are at the same vacuum level as that of vacuum piping (3').

Water flows from the insulated distillate liquid trap (19') into the first insulated distillate collection tank (26') through open water inlet control valve (24'). When the first of the insulated distillate collection tanks (26') is filled with water, water inlet control valve (24') to that insulated distillate collection tank (26') closes, collection tank drain valve (27') to that tank opens, vacuum valve at (25') to that tank remains closed, and vent valve at (25') for that tank opens and the distillate inside the tank drains to the discharge piping (28'). As soon as that insulated distillate collection tank (26') is empty of fluid, the vent valve at (25') closes, water inlet control valve (24') remains closed, collection tank drain valve (27') closes, and the vacuum valve at (25') opens to evacuate all air from the freshly emptied insulated distillate collection tank (26'). Once the insulated distillate collection tank (26') is evacuated, the vacuum valve at (25') closes, and water inlet control valve (24') is opened to allow the distillate to be once again collected in the insulated distillate collection tank (26').

The insulated distillate collection tanks (26') alternately drain and fill so that a continuous flow of water through the insulated distillate liquid trap (19') occurs. The insulated distillate collection tanks (26') are insulated to isolate them from ambient temperatures, and the piping from the insulated distillate liquid trap (19') to the insulated distillate collection tanks (26') is also insulated.

The elements described in this area could be replaced by a known rotating vane device.

The discussion with respect to the second embodiment herein has been directed to the separation of water from glycol. It is again to be understood that other liquids, fluids or solutions are contemplated including human and animal bodily fluids. If one is to use the second embodiment in the treatment of blood, certain modifications are understood to be made. Solution feed pump with inlet filter/strainer (20') may be replaced by intravenous tubing connected at solution regulating valve (21') and then to a donor or typical blood collection container. Blood distillates collected at insulated distillate collection tank (26') would not be exposed to atmosphere at the vent valve at (25') nor would they be discharged into piping as shown at (28'). Instead, blood distillates would be collected at insulated distillate collection tank (26') in a suitable detachable container approved for medical purposes which would allow the distillate to remain sterile and under a vacuum condition. This vacuum distillate in the detached container (26') could be tested, supplemented, and reinjected into a donor or stored for future use. Blood concentrates (salts, residues, etc.) collected at tank (10') may be stored for later recombination with the distillate or otherwise, may be reused, may be tested and screened, or may be disposed of all as desired by the user.

We claim:

1. A vacuum distillation apparatus comprising:
   a vacuum means for generating vacuum pressure;
   a distillation and separation chamber having an evaporator chamber and a condensing means, said condensing means being in communication with said evaporator chamber;
   a vapor separation means and a heating means located in said evaporator chamber;
   a heat exchanger connected to said condensing means;
   a degassification tank connected to said evaporator chamber and said vacuum means;
   a liquid transfer means having a first end extending into liquid to be distilled and a second end opening into said evaporator chamber through said degassification tank;
   a discharge pipe connected to said evaporator chamber for draining non vaporized material from said evaporator chamber;
   a distillate trap connected between said condensing means and said vacuum means;
   a collection means connected to said distillate trap for collecting distillate that passes through said distillate trap; and
   a computer control means for ensuring that a vacuum level in said vacuum distillation apparatus corresponds to a latent heat of vaporization point which represents a set relationship with respect to the temperature of the liquid to be distilled before activating the heating means for use, wherein said liquid to be distilled passes through said liquid transfer means into said degassification tank, into said distillation and separation chamber and as distillate out of said distillate trap.

2. The vacuum distillation apparatus of claim 1 further comprising sensors connected to said computer control means for automated operation of the vacuum distillation apparatus.

3. The vacuum distillation apparatus of claim 1 wherein said distillate trap, said distillation and separation chamber, and said collection means are insulated and atmospherically sealed.

4. The vacuum distillation apparatus of claim 3 further comprising a third end of said liquid transfer means, said third end connecting to said heat exchanger; and a valved exit pipe having a first end which extends into said liquid to be distilled and a second end which connects to said heat exchanger, such that said liquid passes through said liquid transfer means into said heat exchanger and out of said valved exit pipe.

5. The vacuum distillation apparatus of claim 3 further comprising a closed and insulated tank for collection of non vaporized materials which have collected in the base of said evaporator chamber, said insulated tank being connected to said evaporator chamber through said discharge pipe and comprising valves and a sensor, said tank being connected through said valves to said evaporator chamber, and said vacuum means, said sensor working in conjunction with said computer means for the opening and closing of said valves.

6. The vacuum distillation apparatus of claim 1 further comprising hydraulic recovery means associated with said distillation and separation chamber for reducing pumping and power consumption in said vacuum distillation apparatus.

7. The vacuum distillation apparatus of claim 1 wherein said vacuum means has at least two atmospherically closed towers; a vented tank connected to said towers; a pump connected between said vented tank and said towers; and valves associated with said towers whereby oil from said tank alternately fills into and empties from each tower.

8. The vacuum distillation apparatus of claim 7 wherein said towers are 35 to 50 feet in height and 6 to 14 inches in diameter.

9. The vacuum distillation apparatus of claim 7 wherein said distillation and separation chamber is 42 to 50 feet in height.

10. The vacuum distillation apparatus of claim 8 wherein said oil fills each tower to a level corresponding to one atmosphere of pressure.

11. The vacuum distillation apparatus of claim 1 wherein said vacuum means is a water seal vacuum pump with air ejectors.

12. The vacuum distillation apparatus of claim 1 wherein said collection means is comprised of at least two tanks, valves and sensors, said tanks being directly connected through said valves to said distillate trap and said vacuum means and also directly connected through said valves to atmosphere, and to a collection conduit open to atmosphere wherein distilled liquid passing through said trap flows toward said at least two closed tanks to be alternately collected and drained from each tank.

13. The vacuum distillation apparatus of claim 1 wherein said vacuum means is a two stage vacuum pump with an in-line desiccant or moisture vapor trap.

14. The vacuum distillation apparatus of claim 1 further comprising a supplemental heating electrode located between said heating means and said vapor separation means.

15. The vacuum distillation apparatus of claim 1 wherein said trap is u shaped.

16. The vacuum distillation apparatus of claim 1 wherein said distillate trap is connected to said condensing means so that the flow of the distillate through said trap is facilitated by gravity.

17. The vacuum distillation apparatus of claim 1 wherein said degassification means is insulated and sealed to atmosphere.

* * * * *